United States Patent [19]

Linz

[11] 4,096,562

[45] Jun. 20, 1978

[54] CLOSED LOOP CONTROL SYSTEMS AND CONTROL DEVICES FOR SUCH SYSTEMS

[75] Inventor: Hans Linz, Kriens-Luzern, Switzerland

[73] Assignee: Viscosuisse S.A., Emmenbrucke, Switzerland

[21] Appl. No.: 787,138

[22] Filed: Apr. 13, 1977

[30] Foreign Application Priority Data

Apr. 14, 1976 United Kingdom .............. 15418/76

[51] Int. Cl.² ........................................... G05B 13/02
[52] U.S. Cl. .................................... 364/105; 318/632; 318/635
[58] Field of Search ..................... 235/150.1; 318/632, 318/635, 637, 678

[56] References Cited

U.S. PATENT DOCUMENTS

3,950,687  4/1976  Watson, Jr. ..................... 318/635 X

Primary Examiner—Eugene G. Botz
Attorney, Agent, or Firm—Seidel, Gonda & Goldhammer

[57] ABSTRACT

Method of controlling a variable in response to an error signal by comparing a signal correlated to and substantially proportional to the controlled variable with a reference signal corresponding to a set point value of the controlled variable. The reference signal varies substantially linearly with time until it reaches or at least closely approaches a limiting value which corresponds to the set point value of the controlled variable.

2 Claims, 11 Drawing Figures

TIME

CLOSED LOOP CONTROL SYSTEMS AND CONTROL DEVICES FOR SUCH SYSTEMS

BACKGROUND OF THE INVENTION

The present invention relates to closed-loop control systems and more especially to control devices for use in such systems.

Closed-loop control systems in their simpler forms generally comprise a sensor for measuring a parameter of interest, a reference signal source which produces a signal corresponding to the set-point or desired value of the measured parameter, a comparator, usually a differential amplifier, which produces a signal proportional to the difference between the measured and set-point signals and a controller which functions to exert a controlling influence on the process being controlled in such manner as to reduce the difference between the set-point and measured signals to zero or to a suitably low value. It should, of course, be noted that the parameter which is measured need not be the same as the parameter on which the controller exerts its influence, although there must be some inter-relation between the measured and controlled parameters in order to achieve the closed-loop situation.

One of the problems with control systems of the above type is that because the rate at which energy can be transferred between energy stores is finite, time delays arise around the control loop. This, combined with the fact that the input and output of a closed-loop control system are interactive gives rise to a response for the system involving one or more real or complex exponential terms. A consequence of this is that the response of a closed-loop control system to a step change in the set-point is generally exponentially variant with time, the response frequently being of the form of a damped sinusoid. Although this form of response can be useful or tolerated in some applications and control systems can be optimised to give a small following error in response to step changes in the set-point, nevertheless, there are some processes where a more linear change with respect to time is desirable. Frequently it is desired also to provide for a controlled rate of change with respect to time and to facilitate adjustability of the rate of change.

SUMMARY OF THE INVENTION

According to the present invention, a control device forms an error signal by comparing a signal corresponding to a measured parameter with a reference signal corresponding to a desired set-point for the parameter and which functions, in response to a step or quasi-step change in the set-point, so as to vary the reference signal generally linearly with respect to time until the reference signal reaches or at least closely approaches a value corresponding to the new set-point. By optimising the response of the control loop the value of the measured parameter can be made to change linearly with time while approaching the new set-point.

Such a control device may include: an error signal generator for producing an error signal corresponding to the difference between a first signal representative of the measured parameter and a second, reference signal, and a reference signal source comprising an integrator for producing, as the reference signal an output which is the time-integral of an input thereto, and means for producing a set-point signal corresponding to a desired value of said measured parameter, the arrangement being such that in response to a change in set-point the output of the integrator changes generally linearly with respect to time until it at least substantially reaches a limiting value corresponding to the new set point.

The invention also provides a closed-loop control system including at least one control device according to the invention and input- and output-interfacing means for interfacing the control device or devices with a process or apparatus which is to be controlled.

In a first embodiment of the invention, an integrator with a constant input signal and a constant integrator gain is used. A threshold switching device is provided so that each time the magnitude of the error signal exceeds a predetermined value, the integrator output is reset to have a value equal to the current value of the first signal being applied to the error signal generator. The error signal generator is suitably a differential amplifier. This embodiment relies on the internal saturation characteristics of the integrator itself and, after the integrator output has been reset to the current value of the first signal, the reference signal, i.e. the output of the integrator, will increase linearly with time until the saturation value of the integrator output is reached. The rate of change of the integrator output with time can be adjusted by varying the magnitude of the input signal. In order to achieve correspondence between the saturation value of the output of the integrator and the desired value of the measured parameter it is necessary to form a signal proportional to the value of the measured parameter and offset this by a suitable amount so as to form the first signal which is applied to the eror error generator. As will be shown later, the appropriate offset is, in fact, determined by the saturation value of the integrator output and also, of course, the set point or desired value of the measured parameter. An advantage of this embodiment is that if there is a large disturbance in the control loop the threshold switch monitoring the output of the error signal generator is triggered causing the integrator to be reset with the result that the value of the measured parameter is smoothly restored to the previously determined set-point.

A second embodiment of the invention relies not on the internal saturation characteristics of the integrator to provide a limiting value for the output of the integrator but rather provides the integrator with its own feedback loop which serves to limit its output value. In this embodiment the output of a transducer may be connected directly to one input of the error signal generator to provide the first signal. The threshold and integrator resetting means are also present although the set point is determined by a control associated with the integrator feedback loop. This feedback loop comprises a differential amplifier whose output is fed to the integrator via high- and low-level selector switches which clamp the input of the integrator to a positive or negative value as long as the output of the differential amplifier lies outside a limited range of positive and negative values. The set-point signal which may, for example, be derived from a variable resistor, is applied to one input of the differential amplifier while the other input is, in fact, the output of the integrator. This control loop functions so that, in response to a change in the set-point sufficient to cause the high- and low-level selector switches to come into operation, the integrator is caused to ramp linearly in the appropriate direction by having its input clamped at a value determined by the high- or low-level selector switch and when the difference between the set point signal and the integrator output have decreased to an appropriately low value the level selector switch ceases its clamping function so that the output of the differential amplifier is delivered direct to the input of the integrator. The result of this is that having increased linearly with time up to this point, the rate of increase of the output of the integrator decreases exponentially until it assumes a value corresponding to the set-point signal. The rate of change of the integrator output over its linear range can be adjusted by adjusting the values at which the level selectors clamp its input.

BRIEF DESCRIPTION OF THE INVENTION

For the purpose of illustrating the invention, there are shown in the drawings forms which are presently preferred; it being understood, however, that this invention is not limited to the precise arrangements and instrumentalities shown.

DETAILED DESCRIPTION OF PREFERRED EMBODIMENT

Figure 1:
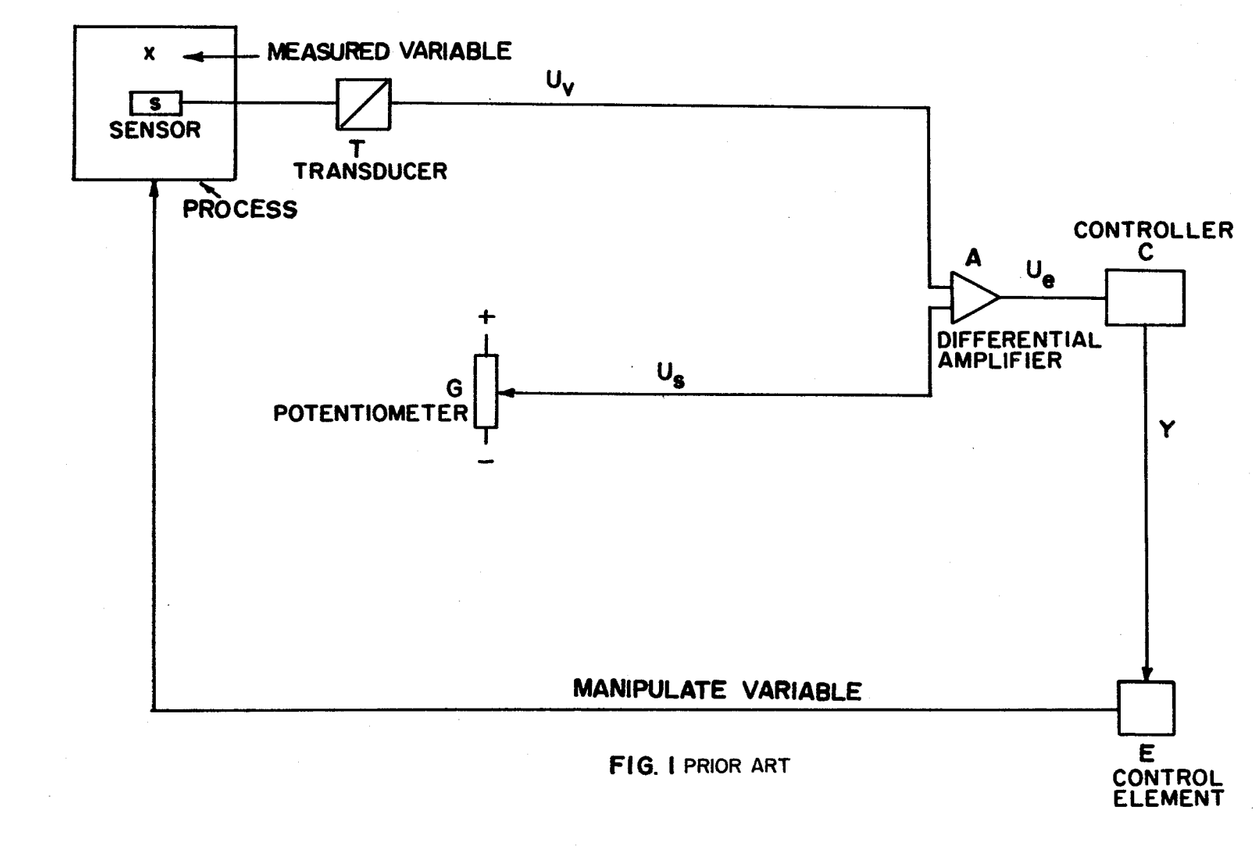
FIG. 1 is a block diagram illustrative of a conventional closed loop control system.

Shown in FIG. 1 is a simple form of conventional closed-loop control system. In the process shown in FIG. 1, the parameter of interest is denoted by $x$, and a sensor $s$ is arranged so that a physical characteristic, for example its electrical resistance in the case of a platinum resistance thermometer, varies in accordance with the value of the parameter $x$. A transducer T associated with sensor $s$ converts the value of this physical characteristic to an electrical signal $Uv$ whose magnitude is proportional to the value of the parameter $x$. This signal $Uv$ is compared by a differential amplifier A with a reference signal $Us$ from a device G, in this case a potentiometer, which is adjusted so that the magnitude of the signal $Us$ corresponds to the desired value of the parameter $x$. The output of the amplifier A is a signal $Ue$ which is generally of the form:

$$Ue = g(Uv - Us)$$

This signal $Ue$ is delivered to a controller C which generates an output signal $y$ in proportion to the magnitude of the error signal $Ue$. Frequently, the output of the controller C does not vary instantaneously with the input but has a time-dependent response so that the output $y$ is, in general given by:

$$y = h(Ue,t)$$

This control signal $y$ is delivered to a control element E which acts on the process to change the value of the parameter $x$ in the direction tending to decrease the value of the error signal $Ue$. If, for example the parameter $x$ is a temperature in the process, and the controlling portion of the control loop is electrical in operation, signals $Uv$, $Us$ and $Ue$ could all be voltages or currents and the output signal $y$ from the controller could function to vary the electrical supply to an electrical heating element.

In practice, each of the blocks shown in FIG. 1 will usually have a transfer function having one or more poles and/or zeros associated with it. Generally, the response characteristics of the control device will be optimised to suit the process which it is desired to control. Such modification often involves cancellation of one time dependent response in the process by an inverse time dependent response in the control device and replacing the cancelled response by a more desirable one.

Figure 2:
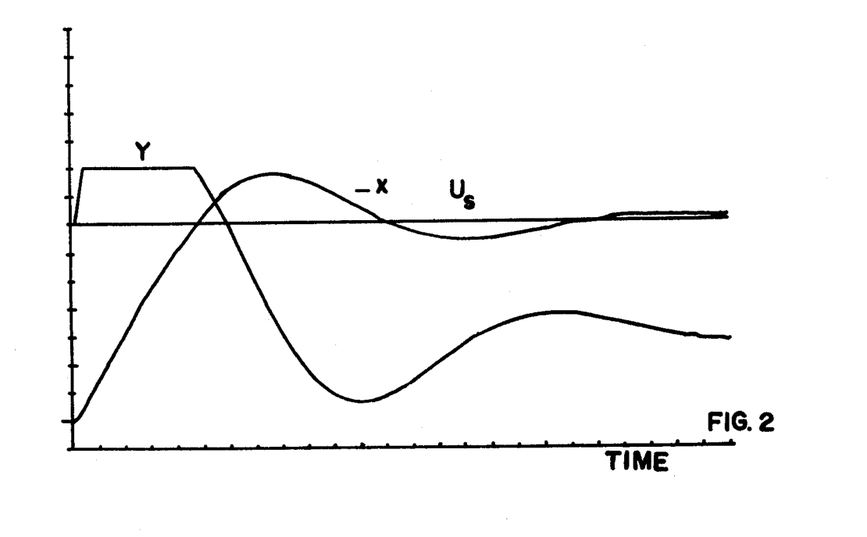
FIG. 2 shows a typical response of the device of FIG. 1 to a step change in its set-point.

A typical response of the control system as shown in FIG. 1 to a step change in the set point $Us$ is shown in FIG. 2 and, it will be seen that the response of the parameter $x$ is a combination of an exponential and a sinusoidal function. Although the rate of change of the parameter $x$ and also its overshoot with respect to the signal $Us$ can be optimised by adjusting the response of elements in the control loop, in general the rate of change of the parameter $x$ and also the magnitude of the overshoot, if any, will be dependent on the magnitude of the step change in the set point $Us$. Some processes however, require a response which varies linearly in time between two values in response to a change in the set point. Also it is often desirable to provide such a linear response with a rate of change with respect to time which is controlled and, optionally, to enable the rate of change to be preselected.

Figure 3:
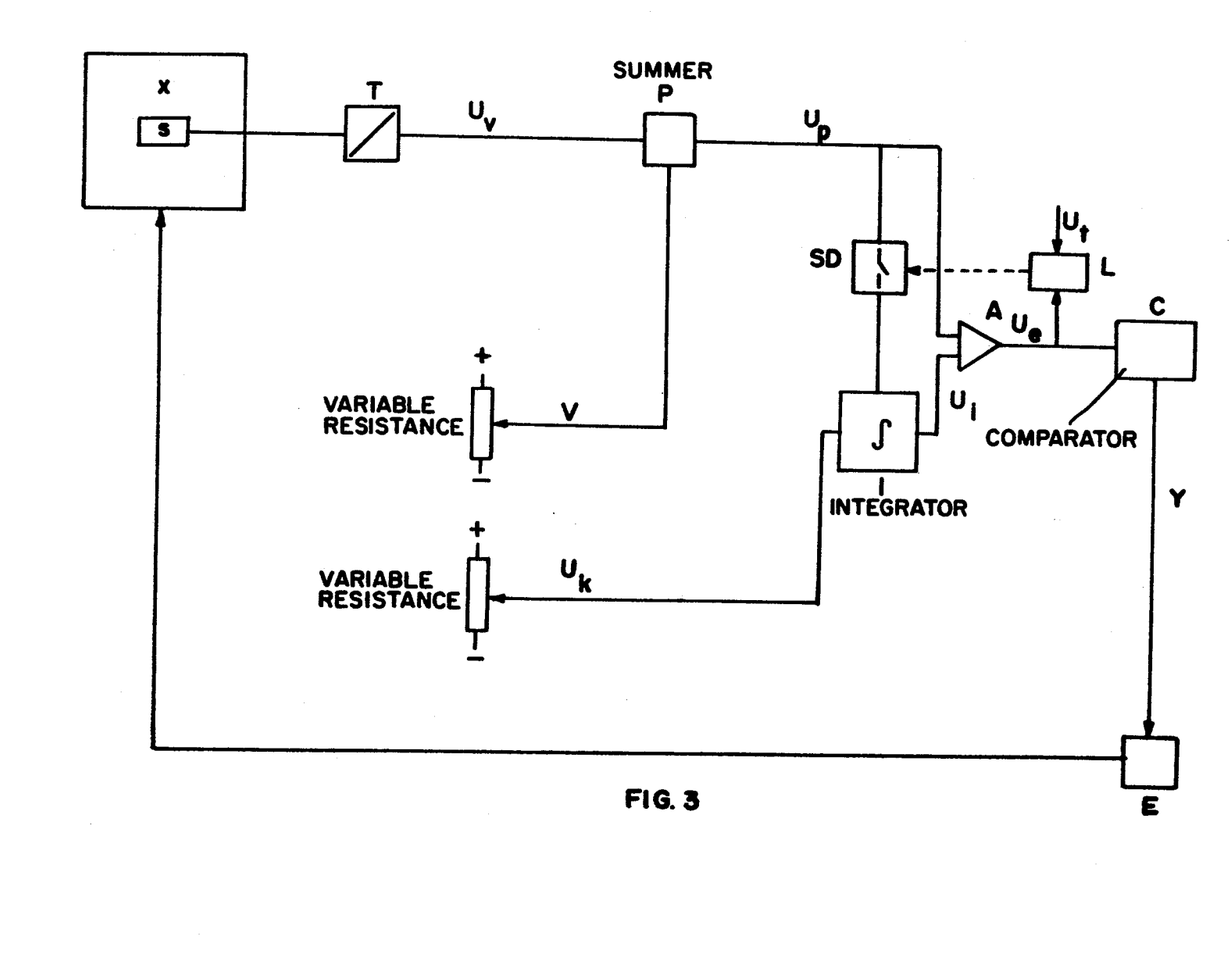
FIG. 3 shows a closed-loop control system incorporating a first embodiment of control device according to this invention.

Shown in FIG. 3 is a first embodiment of the invention. It will be seen that certain of the parts of the control loop are the same as those shown in FIG. 1, namely the sensor $s$, the transducer T, the error amplifier A, controller C and control element E. However, whereas in the arrangement shown in FIG. 1 the set point signal $Us$ was applied directly to the reference input of the error amplifier A, in the embodiment shown in FIG. 3 the reference input of the error amplifier A receives a signal $Ui$ which is the time-variant output of an integrator I. The input to the integrator I is a signal $Uk$ derived from a variable resistance. Interposed between the output of the transducer T and the associated input of the error amplifier A is a summing block P which serves to add to the output signal $Uv$ of the transducer T, a signal V derived from a variable resistance.

A threshold switch L compares the output signal $Ue$ of the error amplifier A with a reference signal $Ut$ and produces an output signal whenever the modulus of the signal $Ue$ exceeds the threshold signal $Ut$, that is to say an output signal is produced from the switch L whenever:

$$-Ut \leq Ue \leq Ut \text{ is not satisfied.}$$

This output signal is used to control a switch SD which, when it receives the output from the switch L, serves to deliver the output signal $Up$ to the integrator so that each time the modulus of the error signal $Ue$ exceeds the threshold level $Ut$ the output of the integrator I is set at the current value of the signal $Up$.

It will be seen that in the embodiment of FIG. 3, the signal U*p*, which is representative of the value of the parameter *x*, is not compared with a fixed setpoint but with the output U*i* of the integrator I, this output U*i* being the time integral of the input signal U*k*. The operation of the embodiment makes use of the fact that the output of the integrator I cannot increase indefinitely but rather saturates at a value of ± UL (depending on the direction in which the integrator is integrating). The output signal U*i* therefore increases (or decreases) linearly with time until the saturation value UL (or −UL) is reached. The output U*i* of the integrator I during its linear operation is given by:

$$U_i = K \cdot U_k \cdot t \text{ for } -UL \leq U_i \leq +UL$$

The constant K is determined by the gain of the integrator I and the signal U*k* is adjusted by adjusting the variable resistor. By adjusting the value of U*k* the direction of integration as well as the slope of the output signal U*i* can be selected as desired.

In the embodiment of FIG. 3, the saturation value UL of the integrator I corresponds to the desired steady state value of the variable *x*. Rather than adjust the saturation value UL of the integrator I to change the setpoint, it is simpler to offset the output signal U*v* from the transducer T by an amount such that the saturation value UL of the output U*i* of integrator I corresponds to the desired steady state value of the parameter *x*. The signal V which is added to the signal U*v* is therefore chosen so that the actual value U*p(x)* of the signal U*p* lies within the range of the output signal U*i* of the integrator and so that the value U*p(xd)* of U*p* corresponding to the desired set point or value *xd* of *x* is equal to one of the saturation values ± UL of the output of the integrator I. The setpoint is thus chosen by adjusting the value of the signal V.

The operation of the embodiment of FIG. 3 is as follows. Assuming the control loop initially to be in the steady state so that the modulus of the error signal U*e* is initially at its minimum value, changing the setpoint by adjusting the value of the signal V, bearing in mind that at this time the integrator I will be saturated, causes the modulus of the error signal U*e* to exceed the threshold value U*t* of the switching means L. This causes the switch SD to close setting the output of the integrator to the new value of U*p*. As a result of this the error signal U*e* becomes zero so that the connection between U*p* and the integrator I via SD is broken. The integrator commences integration so that its output U*i* increases linearly with time at a rate determined by the value of the signal U*k*. The error signal U*e* therefore increases at the same time causing the controller C and control element E to exert a controlling influence on the parameter *x*. Since the signal U*p* is offset with respect to the signal U*v* by an amount V corresponding to the desired steady state value *xd* of the parameter *x* then, when the output signal U*i* reaches its saturation value UL, the parameter *x* will be at its new, desired set point value *xd*.

Further insight into the operation of the embodiment of FIG. 3 can be gained from the following analysis.

In general the signal U*v* can be said to be substantially proportional to the value of the measured parameter *x*, that is to say:

$$U_v = a + bx \tag{1}$$

where *a* and *b* are constants.

This is of course a first order approximation and in writing this and the following equations higher orders have been neglected.

The output signal U*i* of the integrator, while the integrator is working over the linear portion of its range, is determined by the magnitude and value of the signal U*k* applied to its input so that:

$$U_i = c + K \cdot U_k \cdot t \tag{2}$$

where *c* and K are constants.

The signal U*p*, is, in effect, the signal U*v* shifted by an amount corresponding in part to the signal V. The magnitude of the shift is such that the value of the signal U*p* corresponding to the desired value *xd* of the parameter *x* is equal to one or other of the saturation values ± UL of the output signal U*i* from integrator I. Thus:

$$U_p(xd) = \pm UL \tag{3}$$

or $$a + b \cdot xd + V = \pm UL \tag{4}$$

Thus, for a particular set point *xd* the signal V should be set to a value:

$$V = \pm UL - a - b \cdot xd \tag{5}$$

This offset V is, as would be expected, dependent on the setpoint *xd* and the saturation values ± UL. The ± sign indicates that the positive or negative saturation value of the integrator I should be selected depending on whether the value of the parameter *x* is required to be increased or decreased. On the assumption that the constant *b* is positive and it is desired to increase the value of the parameter *x*, the positive saturation value +UL of the integrator I is chosen as the required steady state output of the integrator block I with the result that V is given by the relation:

$$V = UL - a - b \cdot xd \tag{6}$$

Assuming that any time constants associated with the portion of the control loop between the output of the amplifier A and the parameter *x*, clockwise around the loop, are small in comparison with the rate of change of the output of the integrator I, then while the control loop is settling back to the steady state after a change in the set point, the following relationship holds for the time which the output of the integrator I has not yet reached its saturation value:

$$U_p \simeq U_i \tag{7}$$

Since $U_P = U_v + V$ (8)

it can therefore be shown that $$UL - b(xd - x) \simeq c + K \cdot U_k \cdot t \tag{9}$$

If *x0* is the value of the parameter *x* prior to the change in set points then $$C = UL - b(xd - x0) \tag{10}$$

Therefore, after a change in the set-point and during the time while the integrator is still operating within its linear range, the value of the parameter $x$ can be approximated by $$x \simeq x0 + (K \cdot Uk \cdot t)/b \qquad (11)$$

Figure 4:
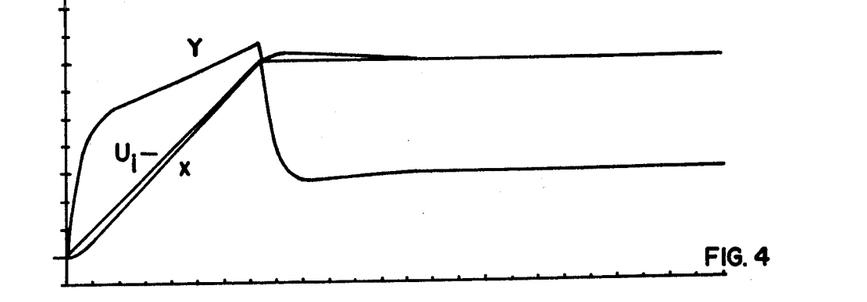
FIG. 4 shows a typical response of the control loop shown in FIG. 3.

From equation (11) it will be seen that while the integrator I is operating within the linear portion of its range the value of the parameter $x$ changes linearly with respect to time and when the integrator reaches its appropriate saturation level $\pm$ UL the value of the parameter $x$ equals the set point value $xd$. It will be apparent that how far the variation of the parameter $x$ with time deviates in practice from that stated in equation (11) will depend on the time constants in the remainder of the control loop. A typical response for the embodiment of FIG. 3 is shown in FIG. 4 from which it will be seen that it is possible to achieve a good approximation to a linear variation of the parameter $x$ between set points. The values of the parameters of the sensor $s$, transducer T, controller C, control element E and the process including the variable $x$ in the control loop of FIG. 3 whose response is shown in FIG. 4 are the same as in FIG. 1. The response shown in FIG. 4 is therefore illustrative of the effect of replacing the amplifier A and setpoint signal source G of FIG. 1 by the arrangement shown in FIG. 3. As can be seen from FIG. 4, the control loop of FIG. 3 shows a much more linear change of $x$ with respect to time and a much lower overshoot. The following-error can be minimised by optimising the parameters of the remainder of the control loop in the conventional manner. It is, of course, possible to vary the rate of change of the parameter $x$ with respect to time between set points by adjusting the value of the signal U$k$ delivered to the integrator and/or the integrator gain although adjustment of U$k$ alone is simpler where the rate of change of parameter $x$ needs to be varied frequently.

Figure 7:
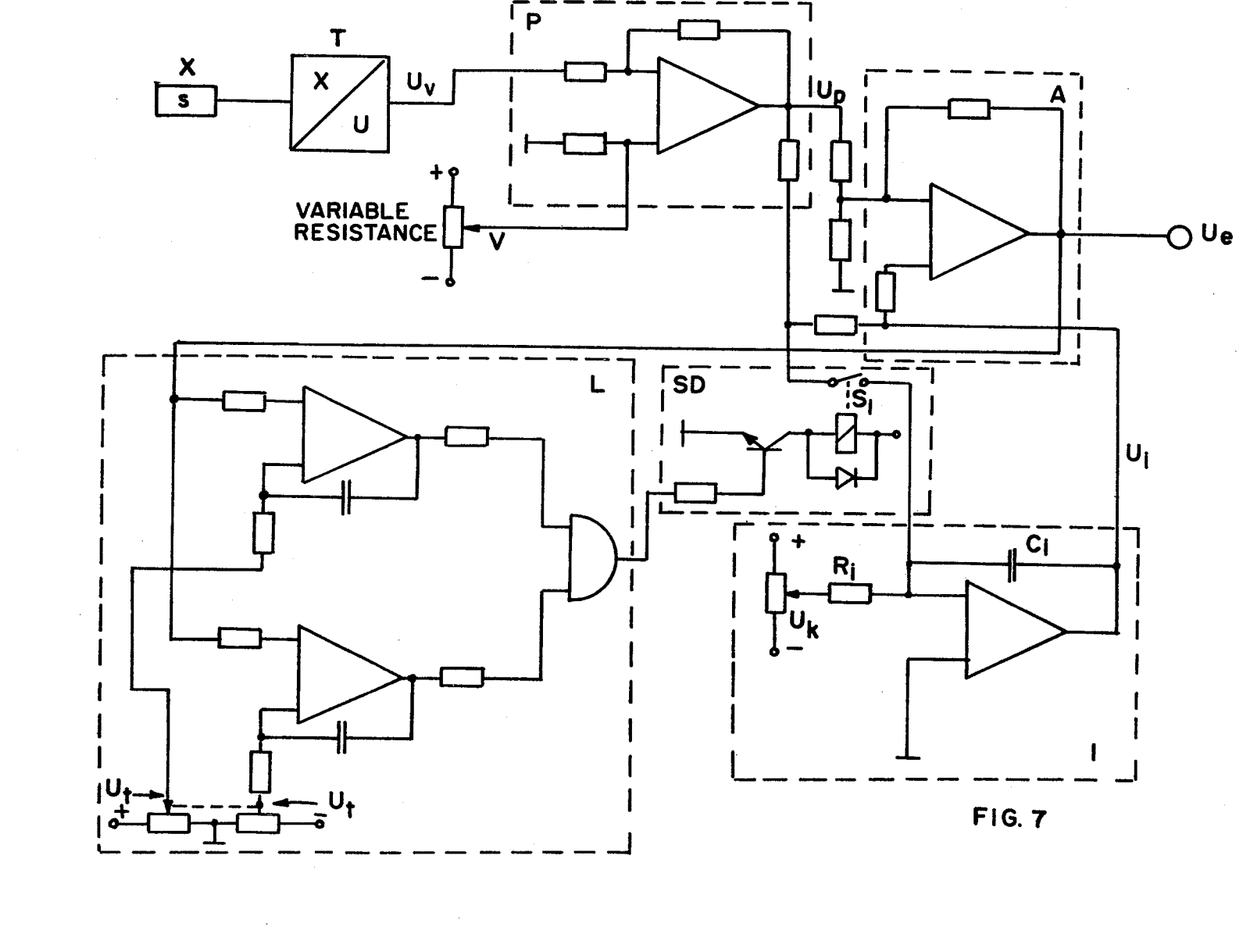
FIGS. 7 and 8 show in more detail forms of the control devices of FIGS. 3 and 5, respectively; and, FIGS. 9 to 11 show how the response of the device of FIG. 5 can be modified.

Shown in FIG. 7 is a simplified practical form of the embodiment of FIG. 3 in which the controlling portion of the control loop is essentially electrical in operation. It will be seen that the transducer T produces an electrical voltage signal U$v$ which magnitude is proportional to the value of the parameter $x$. The offset signal V is also a voltage derived from the movable tapping of a variable resistor and the voltges U$v$ and V are summed by the summer P which is in this case an operational amplifier as is the comparing amplifier A. The signal U$p$ is delivered from the output of the operational amplifier in the summer P and applied to one input of the differential amplifier A. The other input to the differential amplifier A is from the output of the integrator which is in this case an operational amplifier operating in the virtual-earth mode with the conventional capacitive feedback by means of a capacitor C$i$ between the output and the inverting input of the amplifier. Also connected to the inverting input is a resistor R$i$ connected to the variable tapping of a variable resistor which provides the signal U$k$. The integrator gain is, as is usual, set by the values of the resistor R$i$ and capacitor C$i$. The ramp-rate of the integrator in the linear portion of its operation is manually adjustable by adjusting the voltage signal U$k$. It will be appreciated that since the circuit relies on the saturation of the amplifier in the integrator, this amplifier should possess latch-up protection circuitry for preventing the output from "sticking" at one of the saturation values.

The switching device L comprises two variable resistors which are used to derive the upper and lower thresholds $+Ut$ and $-Ut$ which are compared with the error signal U$e$. These two voltage signals are each compared by a respective operational amplifier with the voltage signal U$e$ which is the output of amplifier A, the operational amplifiers operating as comparators and delivering their output to an OR gate so that when the magnitude of the voltage U$e$ exceeds, in the appropriate sense, one of the threshold values $+Ut$ and $-Ut$, an output is delivered from the OR gate via a resistor to the base of the NPN transistor in switch SD. In the collector circuit of this transistor is a relay which has associated therewith a normally open switch S1 connected via a resistor between the output of the summer P and virtual-earth mode of the integrator I. From a control system point of view the circuit shown in FIG. 7 operates in a manner substantially as described with reference to FIG. 3, the output signal U$e$ being fed to the controller C. If, for example, the parameter $x$ which it is desired to control were a temperature, then the signal U$e$ could be used to control the power supply to an electrical heating element. This could be achieved by, for example, placing a triac or SCR in series with a heating element and operating the triac or SCR in either the phase-control or burst-fire control mode in dependence on the value of the voltage signal U$e$. Operation in the burst fire mode could be achieved by comparing the error voltage U$e$ with a ramp voltage from a ramp generator and gating the triac on for that period during each cycle when the error voltage exceeds (or is less than, as appropriate) the ramp voltage.

Figure 5:
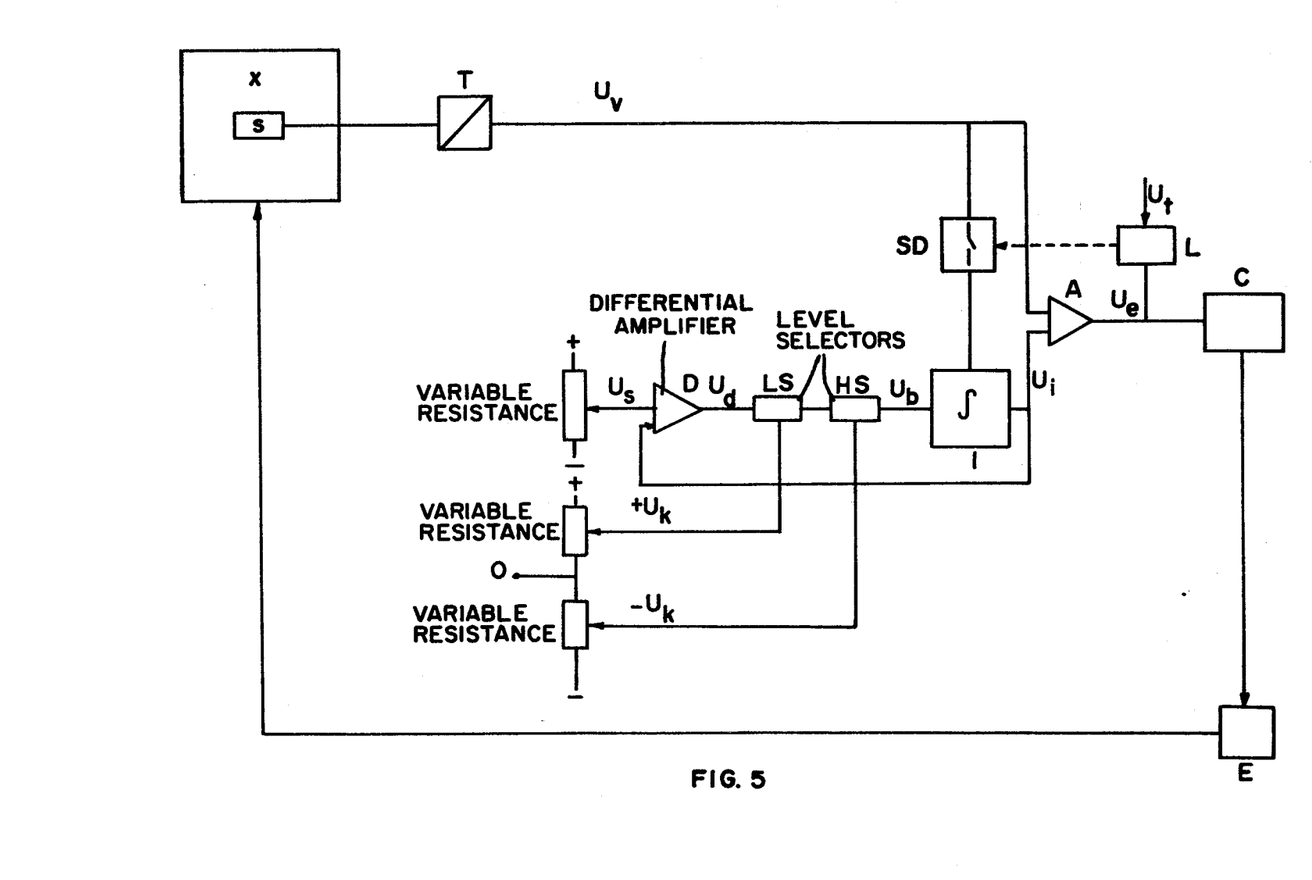
FIG. 5 shows a further closed loop control system incorporating a second embodiment of control device according to the invention.

Shown in FIG. 5 is an alternative embodiment of the invention which relies on a rather different means of achieving a correspondence between a limiting value of the output of the integrator and the desired set point $xd$. Those elements of the control loop which perform the same functions as in the embodiment of FIG. 3 are given like designations in FIG. 5. It will be seen that in the embodiment of FIG. 5 the summing block P of FIG. 3 is omitted, the signal U$v$ from the transducer T being applied directly to one input of the comparing amplifier A. Instead, the integrator I forms part of its own control loop which comprises respective variable resistors for delivering a set-point signal U$s$ and two limiting signals $+Uk$, and $-Uk$, a differential amplifier D and two level selectors LS and HS. In this embodiment, the set-point is set directly by means of the variable resistance providing the signal U$s$. This set-point signal U$s$ is compared, by the differential amplifier D, with the output U$i$ of the integrator I to provide a difference signal U$d$. This signal is passed through the level selectors LS and HS to appear as a signal U$b$ at the input of integrator I.

The embodiment of FIG. 5, relies not on the internal saturation of the integrator as such, but rather on the control of the input to the integrator so that its input is bounded to remain between two limiting values and its output in the steady state corresponds to the set-point. This is achieved by means of the level selectors LS and HS which function to ensure that the signal U$b$ delivered to the input of integrator I is always between two limiting values, namely $+Uk$ and $-Uk$ as set by their associated variable resistances. For symmetry of operation $|-Uk| = |+Uk|$. Although this is not essential, it will be assumed to be the case in the interests of simplicity. Thus, assuming these upper and lower limits are in fact equal in magnitude, if the modulus of the signal U$d$ is less than the modulus of U$k$ the signal U$d$ is delivered direct to the input of integrator I. If, however, the modulus of U$d$ exceeds the modulus of U$k$ then according to whether U$d$ is positive or negative, the appropriate signal +U$k$ or −U$k$ is delivered as the input U$b$ to the integrator I.

The operation of this embodiment of the invention is as follows: the desired set-point for the parameter $x$ is set by adjusting the magnitude of the signal U$s$ from the variable resistor. The desired rate of change of the parameter $x$ is adjustable by varying the signals +U$k$ and −U$k$ from their associated variable resistors. In response to a sufficiently large change in set-point the difference signal U$d$ between the integrator output U$i$ and the set-point signal U$s$ is caused to fall outside the limiting values defined by +U$k$ and −U$k$ so that the signal applied to the input of integrator I, namely U$b$, assumes the appropriate value +U$k$ or −U$k$. The output of the integrator I therefore increases linearly in time as long as the difference signal U$d$ exceeds the limiting value defined by +U$k$ and −U$k$. On the same assumption made in the describing embodiment of FIG. 3 with respect to the time constants of the remainder of the control loop, as the signal U$i$ is increasing linearly with respect to time, the value of the parameter $x$ will increase linearly also. After a time the difference signal U$d$ representing the difference between the setpoint signal and the integrator output U$i$ will reduce so that it then lies within the limiting values defined by +U$k$ and −U$k$. At this stage the level selectors LS and HS cease their overriding function and deliver the difference signal U$d$ directly as the input signal U$b$ to the integrator I. Thereafter, the control loop comprising differential amplifier D and integrator I functions in a linear mode so that the output of integrator I changes from a linear function and "bends" with an exponentially decreasing slope into the steady state value (which is U$s$).

It should be noted that the switches L and SD work in a rather different fashion from those of the FIG. 3 embodiment in that the switch SD will not usually be operated in response to a change in set-point. Here, rather, the only two conditions when the switch SD will be operated are when the control loop is switched on and when a large disturbance arises in the control loop.

In the embodiment of FIG. 5 the set-point signal is correlated directly with the value of the signal U$v$ corresponding to the desired value $xd$ of $x$ so that $$U s = Uv(xd) \text{ or}$$

$$Us = a + bxd \quad (12)$$

where $a$ and $b$ are constants.

This signal U$s$ is applied to the differential amplifier D together with the output U$i$ of the integrator so that the output U$d$ of the amplifier D is given by:

$$Ud = e(Us - Ui) \quad (13)$$

The transfer function of the integrator itself is such that $$Ui = c + K \int Ud\, dt \quad (14)$$

where $c$ is a constant.

If the output U$d$ of the amplifier D were fed directly to the input of the integrator I then the output U$i$ of the amplifier would be given by:

$$Ui = Us - (Us - Ui0)\exp -(t - t0)/\tau \quad (15)$$

where U$i$0 is the value of U$i$ at the time $t = t0$.

The time constant $\tau$ is inversely proportional to the constants $e$ and $k$ of equations 13 and 14 respectively. Thus, if the output of the differential amplifier D were fed directly to the input of the integrator the result would be that the output signal U$i$ would vary exponentially with respect to time. However, since it is desired that the output vary linearly with respect to time for the major portion of the time between a change in setpoint and the parameter $x$ reaching the fresh set-point, the high and low level selectors HS and LS are interposed between the differential amplifier D and the input of the integrator I. This means that the signal U$b$ is given by:

$$Ub = Ud \text{ for } -UK \leq Ud \leq Uk, \ Ub = -Uk \text{ for } Ud$$
$$< -Uk \text{ and by } Ub = +Uk \text{ for } Ud > Uk$$

For symmetry of operation, $|-Uk| = |+Uk|$ so that the signal U$b$ is kept at a constant value, equal to the appropriate one of the +U$k$ and −U$k$ signals except when $$Us - Ui < Uk/e$$

where $e$ is amplifier D's differential gain.

Thus as long as the difference signal U$d$ lies outside the range defined by the +U$k$ and −U$k$ signals, the output of the integrator changes linearly at a rate determined by the appropriate one of the +U$k$ and −U$k$ signals and hence on the assumptions set out above, the parameter $x$ also varies linearly with respect to time. And when the signal U$d$ decreases sufficiently so as to lie within the range, the output of the integrator I and hence the value of parameter $x$ exponentially approach the values U$s$ and $xd$ respectively.

Figure 6:
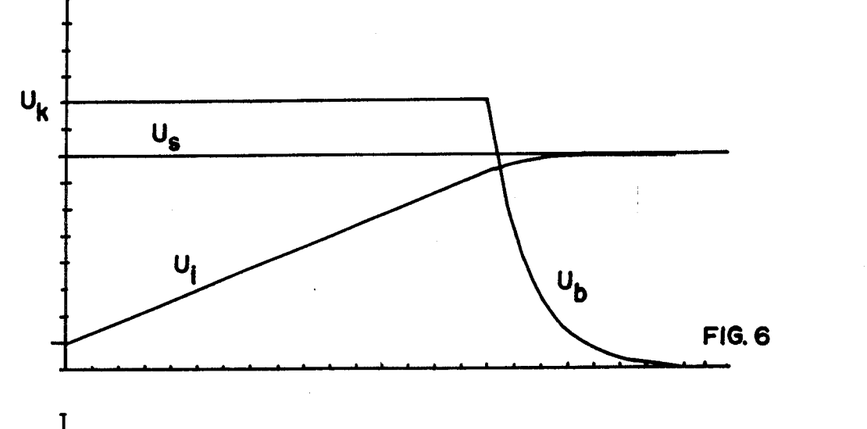
FIG. 6 shows a typical response of the feedback of the device of FIG. 5.

A typical response from the embodiment of FIG. 5 is shown in FIG. 6. Here, the set-point value is changed at a time $t = 0$ from value 1 (in arbitary units) to a value 8. The output U$i$ of the integrator therefore increases linearly with respect to time as the input U$b$ to the integrator I is clamped at the value U$k$. As soon as the value of the difference signal U$d$ becomes less than the value U$k$, the output signal U$i$ changes from a linear function into an exponential function which as can be seen bends into the set-point value U$s$.

More specifically, it will be seen that initially the difference between the signals U$s$ and U$i$ is about seven units. For this example, the gain $e$ of the amplifier D is taken to be sixteen units and the high and low level selectors HS and LS are set at + 10 and − 10 units respectively. Since initially the value of the difference between U$s$ and U$i$ would be 7 units, the value of U$d$ is therefore 112 units. However this value is outside the range of − 10 to + 10 set by the high and low level selectors, and the signal applied to the integrator is therefore 10 units as determined by the level selectors. Thus the output U$i$ of the integrator varies substantially linearly with time until the difference U$s$ − U$i$ has decreased to about 0.6 units. At this stage the level selectors cease their overriding function and the signal U$d$ is applied directly to the input of the integrator so that the variation of the signal U$i$ with time is as set forth in Equation 15. This means that the signal U$i$ curves exponentially into the value U$s$ with a slope which decreases progressively towards zero until the set-point value U$s$ is reached.

Figure 9:
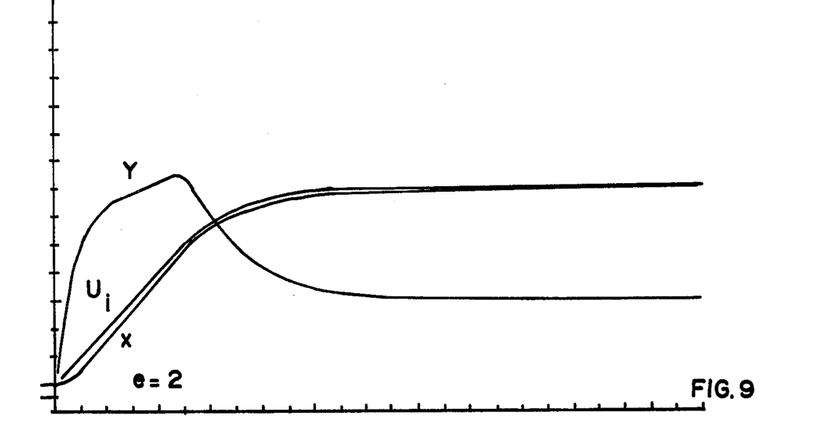
Figure 10:
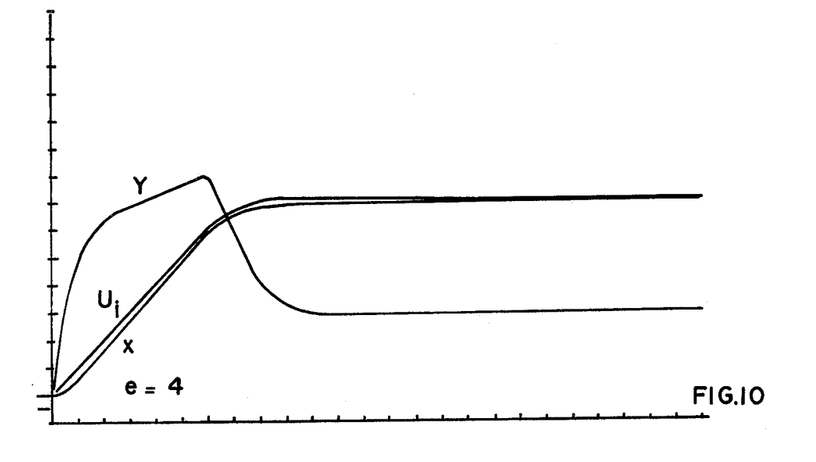
Figure 11:
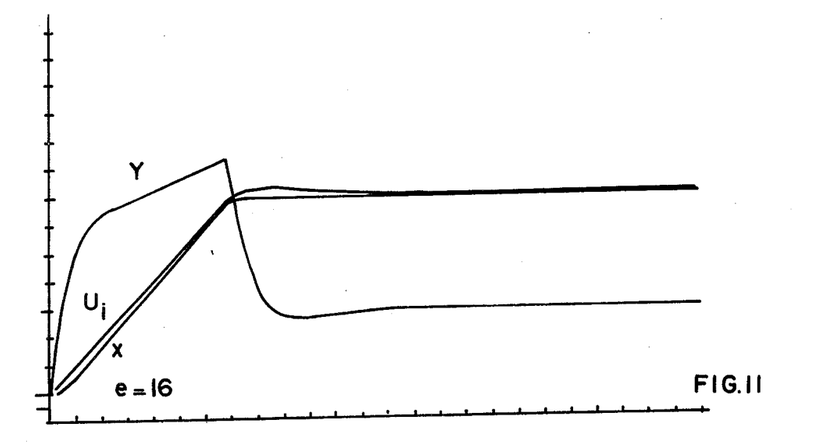

The embodiment of FIG. 5 has two principal advantages over that shown in FIG. 3. Firstly, since the limiting of the value of the output signal U$i$ of the integrator is achieved not by allowing the integrator itself to saturate but rather by controlling the input U$b$ thereto, a disturbance in either direction of the value of the parameter $x$ will be compensated by triggering of the switching device L to reset the integrator I. It is clear that whereas the embodiment of FIG. 3 will only perform this function for major disturbances in one direction, which direction depends on which of the positive and negative saturation values of the output of the integrator is currently being delivered, the embodiment of FIG. 5 can compensate for disturbances of the values of the parameter $x$ in either direction. Secondly, it will be seen from FIG. 4 that in the case of the device of FIG. 3, the transition between the time-dependent portion of the operation and the steady state condition is very sharp, this being evident from the sharp change in value in the control signal $y$ which is representative of the energy flow to the controlled part of the loop. This results in a very rapid change of the load which in certain circumstances can be undesirable. The device of FIG. 5, on the other hand, acts so that a smoother transition between the initial and steady state condition is achieved. The relative proportions of the time which the integrator operates in its linear and exponential modes during a change in set-point is dependent on the gain $e$ of amplifier D. FIGS. 9 to 11 are illustrative of the change in response resulting from the gain $e$ being set at the values 2, 4 and 16 respectively. The other operating parameters are the same as for FIGS. 2 and 4.

Figure 8:
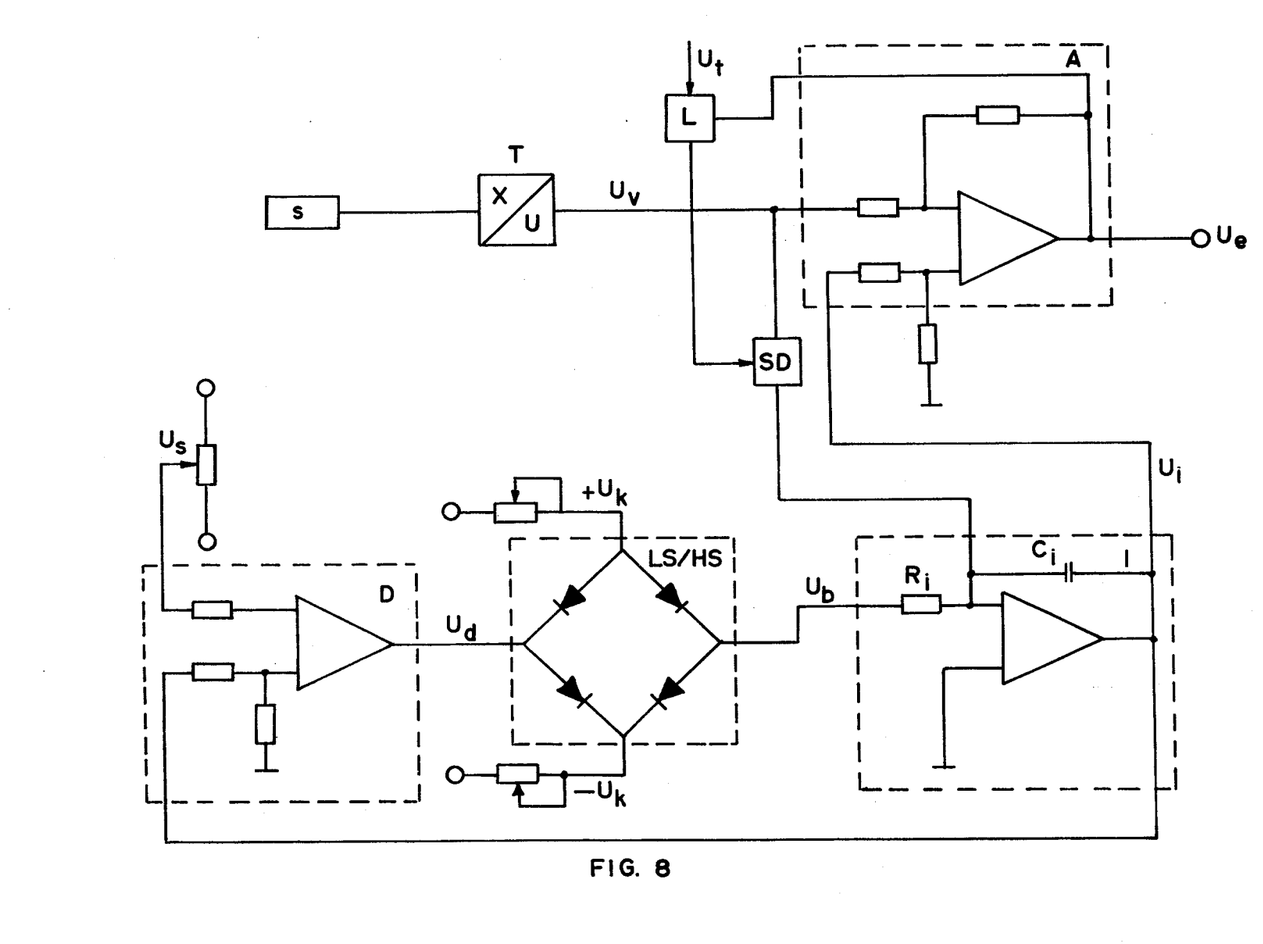

Shown in FIG. 8 is an electrical circuit according to the embodiment of FIG. 5. Generally, the circuit blocks T, L, SD, A and I are similarly arranged as in FIG. 7 although it will be noted that the output U$v$ of the transducer T is delivered direct to one input of the amplifier A. The differential amplifier D comprises an operational amplifier to one of whose inputs is applied the set-point signal U$s$ derived from the tapping of the variable resistor, the other of its inputs being the signal U$i$ fed back from the output of integrator I. Interposed between the output of amplifier D and the input of integrator I is the high level and low level switching network LS/HS which as can be seen comprises a conventional diode switching ring. The signals + U$k$ and − U$k$ which are used to determine the values at which the input signal U$b$ is clamped are derived from their respective variable resistors. The operation of the circuit is substantially as described with reference to FIG. 5, the output signal U$e$ again being fed to controller C.

Although both the embodiments of FIGS. 3 and 5 have been explained in terms of electrical control devices it will be appreciated that the control devices could equally well be pneumatic or hydraulic either in part or throughout. Also, the control loop could be electrical in operation but instead of functioning in an analogue manner could be essentially digital in operation. How a digital control device embodying the invention would be arranged would be apparent to those skilled in the art; the parameter $x$ could of course be represented either by a digital word value or a pulse frequency, in the latter case a particularly convenient form for the integrator would be an up/down digital counter.

The present invention may be embodied in other specific forms without departing from the spirit or essential attributes thereof and, accordingly, reference should be made to the appended claims, rather than to the foregoing specifications as indicating the scope of the invention.

I claim:

1. A process for the automatic control of a variable $x$ comprising:

generating a preselected signal U$k$, generating a reference signal U$i$ substantially linearly with time $t$ such that $$Ui = c + K \cdot Uk \cdot t$$

where $c$ and $K$ are constants, limiting the range of the reference signal U$i$ between preselected limits + UL and − UL such that $$- UL \leq Ui \leq +UL,$$

generating a set point signal V which represents a set point value $xd$ of a controlled variable $x$, generating a signal U$p$, which is correlated to the value of said controlled variable $x$ and which is dependent on said set point signal V such that $$Up = a + b \cdot x + V,$$

wherein $a$ and $b$ are constants and said signal U$p$ equals one of said limits ± UL when the controlled variable $x$ reaches said set point value $xd$, generating an error signal U$e$ which is proportional to the difference between said U$p$ and U$i$ signals, generating a threshold signal U$t$ comparing the error signal U$e$ with the preselected threshold signal U$t$, and automatically setting the reference signal U$i$ to the value of the signal U$p$ when the modulus of the error signal U$e$ exceeds the threshold signal U$t$.

2. A process for the automatic control of a variable $x$, comprising:

generating a set point signal U$s$ which represents a set point value $xd$ of a controlled variable $x$, generating a reference signal U$i$ which varies linearly as well as exponentially with time $t$ by:

comparing the reference signal U$i$ with said signal U$s$, generating a signal U$d$ which is proportional to the difference between the preselected signal U$s$ and the reference signal U$i$, such that $$Ud = e \cdot (Us - Ui),$$

where $e$ is a constant not less than unity, limiting the range of the signal U$d$ between preselected limits −U$k$ and +U$k$, integrating the signal U$d$ so limited to generate the reference signal U$i$, said reference signal U$i$ changing substantially linearly with time as long as the modulus of the signal U$d$ is greater than one of the limits ± U$k$ and said reference signal U$i$ changing exponentially with time when the modulus of the signal U$d$ is smaller than the one of the limits ± U$k$, the rate of change of said reference signal U$i$ linearly with time being determined by the value of the limits ± U$k$, the point of change of said reference signal U$i$ from varying linearly with time to varying exponentially with time being determined by said constant $e$, generating a signal U$v$ which is correlated to said substantially proportional to said controlled variable $x$, generating an error signal U$e$ which is proportional to the difference between said signals U$v$ and U$i$, generating a threshold signal U$t$ comparing the error signal U$e$ with the preselected threshold signal U$t$, and automatically setting the reference signal U$i$ to the value of the signal U$v$ when the modulus of the error signal U$e$ exceeds the threshold signal U$t$.

* * * * *